(12) United States Patent
Ben Saied et al.

(10) Patent No.: US 9,608,967 B2
(45) Date of Patent: Mar. 28, 2017

(54) METHOD AND SYSTEM FOR ESTABLISHING A SESSION KEY

(71) Applicant: COMMISSARIAT A L'ENERGIE ATOMIQUE ET AUX ENERGIES ALTERNATIVES, Paris (FR)

(72) Inventors: Yosra Ben Saied, Paris (FR); Christophe Janneteau, Chaudon (FR); Alexis Olivereau, Orsay (FR)

(73) Assignee: Commissariat A L'Energie Atomique ET AUX Energies Alternatives, Paris (FR)

( * ) Notice: Subject to any disclaimer, the term of this patent is extended or adjusted under 35 U.S.C. 154(b) by 0 days.

(21) Appl. No.: 14/388,191

(22) PCT Filed: Mar. 15, 2013

(86) PCT No.: PCT/EP2013/055436
§ 371 (c)(1),
(2) Date: Sep. 25, 2014

(87) PCT Pub. No.: WO2013/143888
PCT Pub. Date: Oct. 3, 2013

(65) Prior Publication Data
US 2015/0067329 A1    Mar. 5, 2015

(30) Foreign Application Priority Data

Mar. 27, 2012 (FR) .................................. 12 52737

(51) Int. Cl.
*H04L 9/00* (2006.01)
*H04L 9/08* (2006.01)
(Continued)

(52) U.S. Cl.
CPC .......... *H04L 63/0428* (2013.01); *H04L 9/085* (2013.01); *H04L 9/0838* (2013.01); *H04L 63/062* (2013.01); *H04L 2209/76* (2013.01)

(58) Field of Classification Search
CPC . H04L 63/0428; H04L 63/062; H04L 9/0838; H04L 9/085; H04L 2209/76
(Continued)

(56) References Cited

U.S. PATENT DOCUMENTS 6,151,676 A * 11/2000 Cuccia .................. H04L 9/3013
380/259
7,849,166 B1 * 12/2010 Chang ................. H04L 63/0428
709/220

(Continued)

FOREIGN PATENT DOCUMENTS

| EP | 1513286 A1 | 3/2005 |
| EP | 2290895 A1 | 3/2011 |

OTHER PUBLICATIONS

J. Laganier, et al., "Using IKE with IPv6 Cryptographically Generated Addresses", IETF draft-laganier-ike-ipv6-cga-02, Jul. 2007.
(Continued)

*Primary Examiner* — Aravind Moorthy
(74) *Attorney, Agent, or Firm* — Baker Hostetler LLP

(57) ABSTRACT

A system and a method is provided for establishing a session key in a context of communications between entities, the identifiers of which are generated cryptographically and for which one of the entities is highly resource-constrained. It includes assigning to assistant entities of the resource-constrained entity, the highest-consuming asymmetric cryptography operations.

15 Claims, 4 Drawing Sheets

(51) Int. Cl.
*H04L 9/32* (2006.01)
*H04L 29/06* (2006.01)

(58) Field of Classification Search
USPC .................. 713/168, 171; 380/262, 278, 44
See application file for complete search history.

(56) References Cited

U.S. PATENT DOCUMENTS

| | | | | |
|---|---|---|---|---|
| 2005/0108571 | A1* | 5/2005 | Lu | G06F 21/34 726/4 |
| 2006/0184789 | A1* | 8/2006 | Karasawa | H04L 63/0428 713/160 |
| 2008/0060055 | A1* | 3/2008 | Lau | H04L 63/0823 726/3 |
| 2008/0114982 | A1* | 5/2008 | Bleumer | G07B 17/00733 713/171 |
| 2008/0144836 | A1 | 6/2008 | Sanders et al. | |
| 2009/0239503 | A1* | 9/2009 | Smeets | H04L 63/06 455/411 |
| 2009/0265541 | A1* | 10/2009 | Ylitalo | H04L 29/12028 713/151 |
| 2010/0149970 | A1* | 6/2010 | Miranda | H04W 28/02 370/229 |
| 2013/0177157 | A1* | 7/2013 | Li | H04L 9/083 380/277 |

OTHER PUBLICATIONS

Jens Mache, et al., "Exploiting Heterogeneity for Sensor Network Security", Proceedings of IEEE Communications and Networks, Jun. 2008, pp. 591-593.

R. Moskowitz, "HIP Diet Exchange (DEX): draft-moskowitz-hip-rg-dex-05", Internet Engineering Tast Force (IETF), Standard Working Draft, Internet Society (ISOC), Mar. 14, 2011, pp. 1-35, No. 5, XP015074877.

Yosra Ben Saied, et al., "Energy Efficiency in M2M Networks: A Cooperative Key Establishment System", 2011 3rd International Congress on Ultra Modern Telecommunications and Control Systems and Workshops (ICUMT), Oct. 5, 2011, pp. 1-8, IEEE, XP032021400.

R. Moskowitz, et al., "Host Identity Protocol", Networking Working Group: IETF RFC 5201, Apr. 2008, pp. 1-105.

Leonid Reyzin, et al., "Better than BiBa: Short One-time Signatures with Fast Signing and Verifying", LNCS 2384, Apr. 30, 2002, pp. 144-153 (1-9).

\* cited by examiner

METHOD AND SYSTEM FOR ESTABLISHING A SESSION KEY

CROSS-REFERENCE TO RELATED APPLICATIONS

This application is a National Stage of International patent application PCT/EP2013/055436, filed on Mar. 15, 2013, which claims priority to foreign French patent application No. FR 1252737, filed on Mar. 27, 2012, the disclosures of which are incorporated by reference in their entirety.

FIELD OF THE INVENTION

The invention relates to the field of network communications and in particular encrypted communications between the entities of a global communication network.

PRIOR ART

In an encrypted communications network, the communicating entities of the network are indicated by means of an identifier which is obtained from a cryptographic parameter, such as for example the public key of an asymmetric cryptographic algorithm.

To proceed with setting up a communication session, an Authenticated Key Exchange (AKE) protocol is implemented between a source entity and a target entity. The aim of this protocol is to derive a session key, but also to establish mutual authentication of the two entities. In the case of communications with identifiers generated cryptographically, the various AKE protocols of the prior art are based on the authentication of an entity upon proof of its knowledge of all of the cryptographic material, i.e. the knowledge of a public key and of a private key, from which its identifier is derived.

Several authenticated key exchange protocols are known, such as those listed by way of example below.

The "Host Identity Protocol Base Exchange" (HIP BEX) described in the paper by [R. Moskowitz, P. Nikander, P. Jokela, T. Henderson, "Host Identity Protocol", IETF RFC 5201, April 2008] proposes a key exchange system based on the well-known Diffie-Hellman protocol. The HIP BEX protocol makes use of Diffie-Hellman mechanisms for generating and exchanging keys, thereby making it costly in terms of resources.

The "Internet Key Exchange-Cryptographically Generated Addresses" (IKE-CGA) protocol described in the paper by [J. Laganier, G. Montenegro, A. Kukec, "Using IKE with IPv6 Cryptographically Generated Addresses", IETF draft-laganier-ike-ipv6-cga-02, July 2007] is a protocol which provides for extending the authentication mechanisms supported by IKE to authentication by means of cryptographically generated addresses. This solution implements cryptographically generated identifiers as part of securing a standard Diffie-Hellman exchange, and remains a costly choice in terms of resources.

Patent EP 2 290 895 A1 describes a solution for establishing security association between two nodes of a network having identifiers generated cryptographically by means of an exchange in two messages. This solution enables a faster session key establishment than in the previous mechanisms which can require three to six messages. Nevertheless, the gain in performance is limited since following this exchange there is a key generation by means of Diffie-Hellman public values of the initiator and of the responder, which values are exchanged in the first and second messages of this solution respectively.

Another approach is defined by Mache et al. in the paper by J. Mache, C.-Y. Wan and M. Yarvis, "Exploiting heterogeneity for sensor network security", in Proceedings of IEEE Communications Society Conference on Sensor, Mesh and Ad Hoc Communications and Networks, June 2008, pp. 591-593. The solution provides for the secure transmission of data between a lightweight sensor and a more powerful server by means of a two-segment communication in which the data is first transmitted from the sensor to a collection node, and then from the collection node to the remote server. The first segment is secured by means of symmetric algorithms while the second segment relies on asymmetric cryptography. The collection node decrypts the data received from the sensor and re-encrypts it for the server, thereby not allowing the establishment of a secure end-to-end communication between the sensor and the remote server. Specifically, confidentiality is not ensured with regard to the collection node.

The protocols and solutions cited, although they meet authenticated key exchange requirements, provide for the use of complex cryptographic primitives in order to prove the identities of the entities of the session, and therefore require that the entities have the appropriate resources. These approaches are not designed to be economical in terms of power.

Thus, these protocols are not suitable for networks in which highly resource-constrained entities must communicate with more powerful entities. Such a type of network, such as the one known as the Internet of Things (IoT), comprises entities (often called nodes) with low power and computational capacity which must use cryptographically generated identifiers to communicate with remote entities that can have powerful resources.

The "HIP Diet Exchange" (HIP DEX) protocol described in the paper by R. Moskowitz, "HIP Diet EXchange (DEX)", IETF work in progress draft-moskowitz-hip-rg-dex-05, March 2011, is aimed at use by low-resource nodes. This is a light version of the key exchange mechanism of the abovementioned HIP protocol. The main modifications introduced by HIP DEX are the use of elliptic curve cryptography, the use of static Diffie-Hellman values, and the use of lighter primitives for the hash functions. Despite the performance advantages obtained over the basic protocol, the HIP DEX protocol remains demanding in terms of resources due to its use of the Diffie-Hellman protocol. Moreover, it uses a shared secret generation mechanism which assumes that all the exchanges of shared secrets led by a node are conducted from the same public value generated by the node only once and being used by it to construct its cryptographically generated identifier. Thus, even if the resource-costly phase for generating the public value disappears, this power saving is achieved to the detriment of the property of perfect forward secrecy, which provides for ensuring that an exchanged secret will not be able to be uncovered by an attacker, even when the long-term secrets of the participants are disclosed.

There is hence the need for a solution which enables an encrypted communication between entities having different resource constraints and ensuring confidentiality of the exchanged secret.

The present invention meets this need.

SUMMARY OF THE INVENTION

An object of the present invention is to provide a method for exchanging keys in the context of communications, the identifiers of which are generated cryptographically.

Another object of the invention is to provide for the use of identifiers generated cryptographically by highly resource-constrained nodes. Advantageously, an authenticated key exchange method relying on these identifiers is proposed.

Another object of the present invention is to provide for the generation of a shared secret between two nodes with cryptographically generated identifiers by means of asymmetric cryptography operations without making use of the Diffie-Hellman protocol.

Advantageously, the mechanism upon which the present invention relies can be implemented in a distributed manner, with the assistance of neighboring nodes to which the highest-consuming asymmetric cryptography operations are delegated.

Advantageously, the present invention extends the use of cryptographically generated identifiers for generating a shared secret to highly resource-constrained nodes, while until now this use was prohibited to them due to the complexity of the key exchange protocols resulting in the cryptographically generated identifiers being used.

Advantageously, the present invention provides for defining, by virtue of cryptographically generated identifiers, the same identification scheme independently of the resource level of the entities considered.

Another object of the present invention is to provide a method which offloads, onto assistant nodes, a highly resource-constrained node of the most resource-intensive cryptographic operations, while ensuring that the assistant nodes cannot become aware of the exchanged secret.

A further object of the present invention is to thus create secure contexts between nodes of a cryptographically identified network.

Another object of the present invention is to increase the life of battery-operated nodes such as sensors.

Advantageously, the present invention will be implemented in the context of the Internet of Things in which there coexist entities with highly heterogeneous resources, such as servers, mobile connected objects, low-power sensors.

Still advantageously but without limitation, the invention will find applications in industrial fields in which protocol stack elements are used for low-resource objects participating in an integrated model of the Internet of Things.

To obtain the results sought, a method as described in independent claim 1, a system as described in independent claim 12 and a computer program product as described in claim 14 are proposed.

In particular, in a communication network comprising a plurality of communicating entities, a method for establishing a session key between a source entity and a target entity is claimed. The method comprises the steps of:

generating a secret x for the source entity, the secret comprising n secret values (x1, xi, xn);

assigning each secret value (xi) to an assistant entity (Pi) among the plurality of communicating entities;

encrypting and signing by each assistant entity the assigned secret value (xi);

authenticating the source entity upon reception by the target entity of one or more encrypted and signed secret values (x1, xi, xn);

generating an encrypted and signed secret y for the target entity;

authenticating the target entity upon reception, by at least one of the n assistant entities (P1, Pi, Pn), of the encrypted and signed secret value y; and generating a session key between the source entity and the target entity upon reception by the source entity of the authenticated secret value.

Various variant implementations are described in the dependent claims.

DESCRIPTION OF THE DRAWINGS

Various aspects and advantages of the invention will become apparent from the description of a preferred but nonlimiting implementation of the invention, with reference to the following drawings.

DETAILED DESCRIPTION OF THE INVENTION

Figure 1:
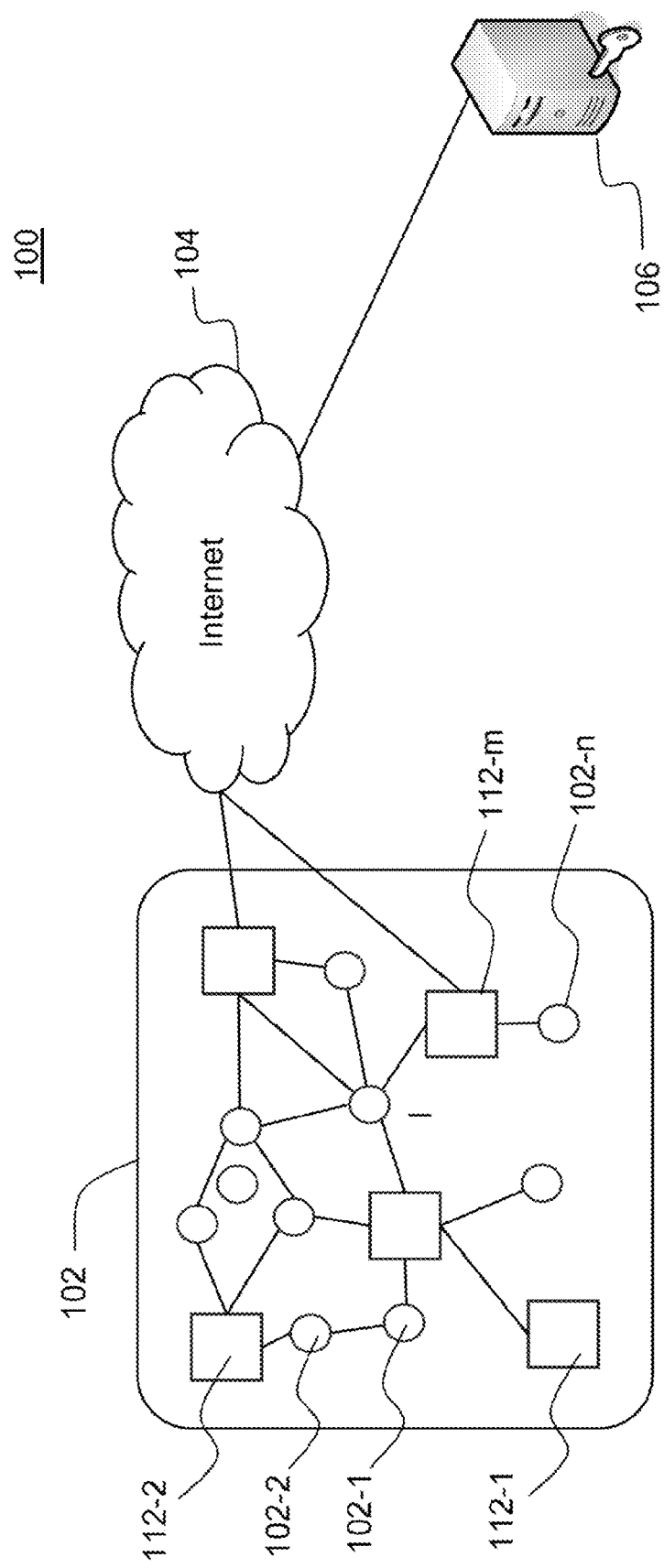
FIG. 1 is a topological representation of a network infrastructure to advantageously implement the invention.

FIG. 1 illustrates a global network environment (100) in which the invention is advantageously implemented. For reasons of simplicity of the description and not of limitation of the invention, the example of FIG. 1 shows only a finite number of entities and connections, but the person skilled in the art will extend the principles described to a plurality and a variety of entities and connection types (wireless, cellular, very high speed).

The global network (100) comprises a set of fixed or moving entities forming a network of objects (102). The network of objects comprises entities with high resource constraints (102-1, 102-*n*) and entities with lower resource constraints (112-1, 112-*m*).

The entities with high resource constraints can be wireless actuators or sensors, having limited computational and/or storage capacities. They can also be active tags. However, an entity which is not intrinsically resource-limited can temporarily be so as soon as it uses a large part of its processor resources for another task, or when its battery level reaches a critical threshold value. And this entity can be made to implement protocols that are less costly in terms of power, such as that of the invention.

The entities with lower resource constraints can be cellphones equipped with an Internet connection and a camera. They can also be gateways for interconnection between a constrained entity network and the Internet. These entities provide very significant computational and storage capacities, can have a greater reserve of power (battery, mains power) and can communicate over a network, either directly to an internet network (104) as illustrated or through intermediate servers and gateways (not shown).

The network of objects (102) can be based on layer 2 communications (for example, 802.15.4 or 802.11) or layer 3 communications (for example, IP) between the entities that form it. Depending on the protocols on which it relies, multicast or broadcast communications schemes can be used therein.

The global network (100) comprises remote entities (106) that do not exhibit resource constraints, in comparison to those of the entities of the network of objects (102).

The remote entities can be servers (for example, a server for storing and/or managing information reported by one or more sensors, or an actuator control server) having significant storage and computational capacities or any other entity exhibiting unconstrained computational, storage and power capacities.

Such a global network forms one that is referred to as an Internet of Things (IoT). It covers two types of communications:
those of object to person;
those of object to object, or machine to machine (M2M).

These communications can be established in a limited context (only one protocol used, for example ZigBee and/or only one targeted scenario, for example the Smart Grid) in which case one refers to the "Intranet of Things", or they can be employed to make possible a large number of different services, while relying on many communications protocols, in which case one refers to the "Internet of Things". Generally, the Internet of Things is understood to be an architecture which provides for interconnecting the conventional Internet with communicating or perceived objects, and which relies on decentralized communication schemes, while implementing autonomous mechanisms.

The present invention can advantageously be applied in the environment of FIG. 1 between a highly resource-constrained entity (102-1) referred to as "initiator" and a powerful remote server (106) referred to as "responder". The two entities need to establish a session key and do not already share between them a long-term secret. The method described with reference to FIG. 2 takes into account the constraints in terms of resources and uses distributed collaborative techniques to make the session key exchange possible between two heterogeneous entities during the same communication.

Figure 2:
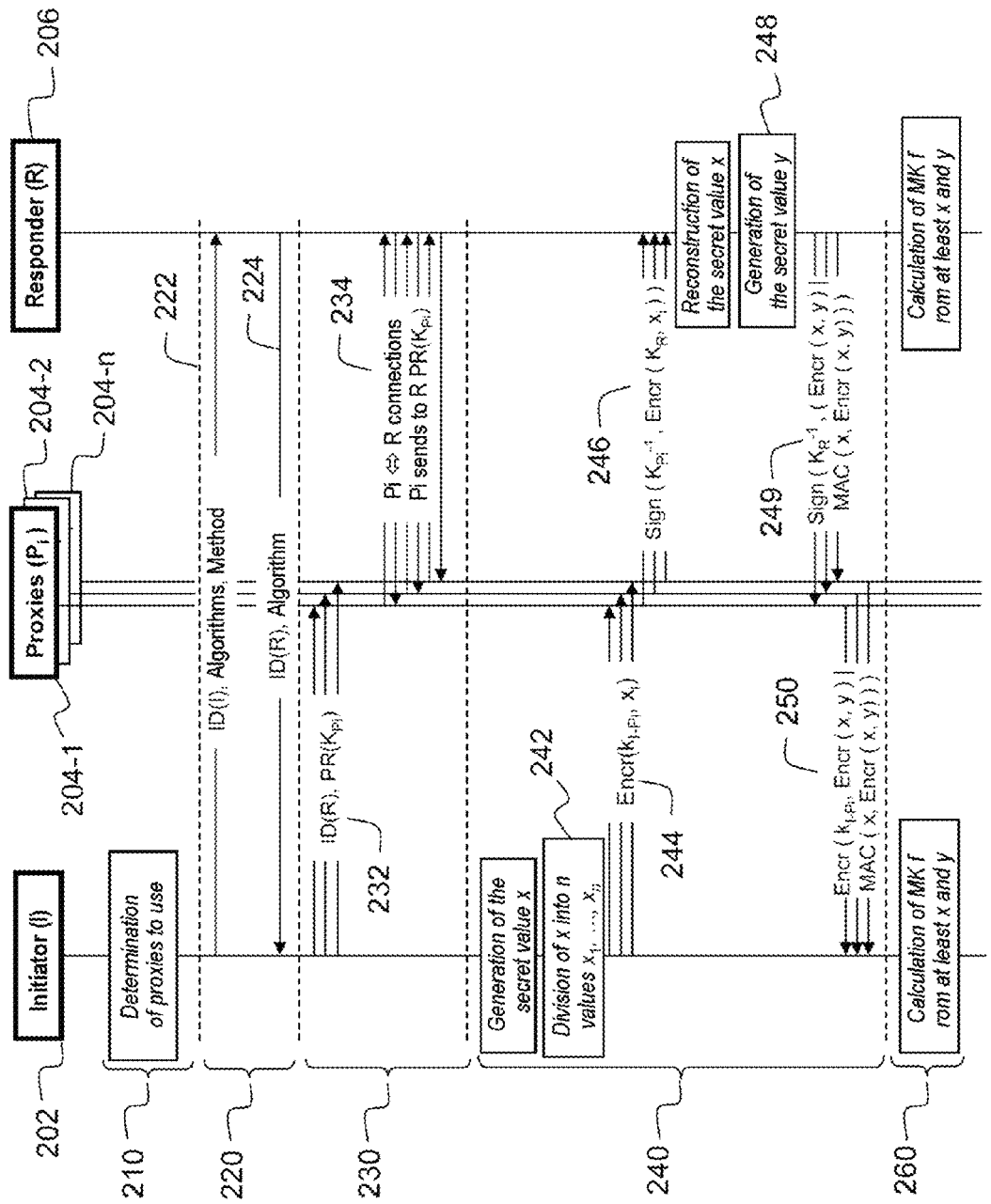
FIG. 2 shows the procedures executed between the source, target and assistant entities of the network of FIG. 1 in an advantageous implementation of the invention.

FIG. 2 shows the procedures executed between an initiator (202) and a responder (206) to establish a session key.

In a first initialization phase (210), the initiator (202) selects assistant entities that are less resource-constrained than the initiator, and referred to hereafter as proxies (204-1, 204-$n$).

The selection can be based on the reputations of the entities close to the initiator and/or on their available resources such as for example their computational capacities or their battery levels. For the case in which the selection is based on the reputations of the neighboring nodes, the latter can be assessed locally or by a central server according to their past attitudes. A metric, the reputation, is hence defined which accounts for the types and proportions of positive attitudes (for example, offering a service) and negative attitudes (for example, refusing to offer a service) that a node has demonstrated in the past.

The determination of the number of proxies to which an initiator will turn to is not described in the present invention, and can for example be dependent on the probability that these proxies conduct an attack against the node by collusion. If the initiator is for example a moving device, the selection process comprises a step for discovering in its vicinity entities with which it can have a shared secret. This discovery can be performed dynamically, and can be facilitated by having recourse to a third entity that is aware of the whole network topology through which the initiator moves.

In one variant, the initiator can contain a predefined list of usable proxies, and the selection of proxies to be used for the session is made on this list.

In a next phase (220), information relating to the security supported by the initiator (202) and by the responder (206) is exchanged.

The initiator (202) sends a message (222) to notify the responder (206) of its identity ID(I), to indicate the cryptographic algorithms that it supports, and the key establishment method which it desires to use. If the responder (206) accepts the proposed key establishment technique, it responds to the initiator with a message (224) which can contain its identity ID(R) as well as a choice of the cryptographic algorithm chosen from among those proposed by the initiator. Specifically, the negotiated key establishment method can for example be based on RSA, ECC; the cryptographic algorithms can include the encryption algorithms: RC4, RC2, DES, AES, 3DES and/or the hash functions MD5 and SHA-1.

At the end of the phase 220, the initiator and the responder have established the connection parameters for their session.

In a next phase (230), the initiator notifies the proxies of the identity of the responder, and a message (232) containing the identity of the responder ID(R) is sent to each proxy selected in phase 210.

In a variant implementation, each message (232) can also contain an item of information PR(Kpi) which will enable each proxy to prove its representativity to the responder.

In a first variant of the invention, the proxies, provided with a public key/private key pair, directly receive from the initiator the proof that they are authorized to act in its name. This proof can be, for example, a certificate associating the public key of the proxy with the "entitlement to sign in the name of the initiator" right, the whole certificate being signed by the private key of the initiator. This certificate can include other parameters added by the initiator with the aim of restricting the capabilities of the proxies to sign in its name, such as the identity of the responder or an expiry date. In the case of a certificate including only the identity of the proxy and its "entitlement to sign in the name of the initiator" entity status, this certificate may have been sent by the initiator to the proxy outside its active session. Alternatively, in the case of a certificate featuring the identity of the responder or including an expiry date, the certificate is sent to the proxy during the active session.

In a second variant of the invention, the authorization of proxies to act in the name of the initiator is managed by a third-party trust entity. The initiator supplies to the trust entity T a certificate associating rights, for giving the network entities rights to sign in the name of the initiator, the identity of T, the whole certificate being signed by a private key corresponding to the cryptographically generated identifier. Advantageously, the trust entity T can be a single physical entity, or it can be a logical entity physically instantiated in the form of different physical entities, implementing a redundancy system so as to ensure a continuity of service in the event of a crash.

The initiator transmits the list of proxies to the trust entity which upon reception transmits to each proxy all the cryptographic information necessary to authenticate the message that each proxy sends to the responder.

In the preferred implementation of this second variant of the invention, the cryptographic information comprises a public key/private key pair of a signature system. Advantageously, such a one-time signature system can be the system referred to as "HORS" described in the paper by L. Reyzin et al. "Better than BiBa: Short One-Time Signatures with Fast Signing and Verifying", LNCS 2384, pp. 144-153, 2002.

The trust entity also supplies to each proxy a means which authorizes the latter to sign protocol exchange messages in the name of the initiator, i.e. to prove its authorization to act in the name of the initiator. This means can take the form of a message cryptographically associating the right assigned to the proxy to sign in the name of the initiator, the certificate sent beforehand by the initiator to the trust entity, the public part of the cryptographic material handed over to the proxy by the trust entity, the whole message being signed by the private key of the trust entity.

After the message 232 is sent, containing the identity of the responder and if necessary the proof of representativity, each proxy establishes a connection with the responder and if necessary sends a message (234) containing the proof of representativity which it has received from the initiator or from a trust entity.

At the end of the phase 230, the responder and the proxies have established the connection parameters for their session.

The next step will involve preparing and exchanging initial models of the session key between the initiator and the responder (also called "pre-master secrets x and y") in order to later calculate the shared session key. The initiator hands over to the responder a randomly generated secret x, and the responder hands over to the initiator a secret y. The session key will then be calculated from these two secret values.

In the next phase (240), the initiator (202) breaks up (242) its secret x into n secret fragments, where n is the number of proxies selected to support the session. Each secret value is assigned to a proxy.

Advantageously, an error correction procedure can be applied on the original secret x before breaking it up, so as to add redundancy to it. This allows the responder to be capable of reconstructing the secret sent by the initiator provided that a sufficient number of packets is received from the assistant nodes, but without requiring all messages from all the assistant nodes to be received. This system protects our solution from being compromised or from a refusal by assistant nodes to collaborate. Furthermore, it provides for not imposing a reliable delivery for each connection between a proxy and the responder.

The initiator transmits (244) to each proxy the secret fragment which is assigned to it. Advantageously, each message is sent securely, using a security association based on a symmetric key ($k_{I\text{-}Pi}$) between the initiator and each proxy.

Upon reception of its secret fragment, the proxy encrypts the fragment and signs the result using its private key. The proxy advantageously encrypts its fragment using the public key of the server which corresponds to its cryptographically generated identifier, as communicated by the initiator in the previous phase.

Then, each proxy transmits (246) to the responder a signed message containing the secret fragment which was assigned to it, and encrypted.

After having received a sufficient number of fragments, the responder can retrieve the original secret x and reconstruct the secret x of the initiator.

The responder in turn randomly generates (248) a secret y and transmits it (249) in a message to the proxies. The message is also constructed from the secret x reconstructed by the responder. The proxies support the computational load required to verify the message received from the responder and to then transmit it (250) to the initiator.

Advantageously, each proxy transmits to the initiator a message protected by means of symmetric keys $k_{I\text{-}Pi}$ shared between the initiator and each proxy. In order to preserve the confidentiality of y, the latter is encrypted with the secret x transmitted beforehand to the responder by the initiator.

Advantageously, in order to assure the initiator that the secret x has definitely been received, the secret y encrypted by x is provided with a "Message Authentication Code" (MAC) calculated with x as key. This MAC message assures the initiator that the encrypted message received has definitely been sent by an entity that is aware of the value x.

In one variant of the invention, the receiver or responder sends to all the proxies a message containing y encrypted by x, provided with a MAC calculated from x, the whole message being signed by means of the private key of the receiver. Upon receiving this message, the proxies verify the validity of the signature of the receiver and, if the message is valid, forward to the initiator the received message without its signature, i.e.: y encrypted by x, provided with a MAC calculated from x, this message being encrypted by means of the symmetric key $k_{I\text{-}Pi}$.

In another variant of the invention, the receiver sends to one or more proxies the message containing y encrypted by x, provided with a MAC calculated from x, the whole message being signed by means of the private key of the receiver. The proxy or proxies to which the receiver has sent the message verify the validity of the signature of the receiver and, if the message is valid, forward to the initiator the received message without its signature i.e.: y encrypted by x, provided with a MAC calculated from x, this message being encrypted by means of the symmetric key $k_{I\text{-}Pi}$.

In a next phase (260), the method proceeds with calculating the session key. The two entities, initiator (202) and responder (206), calculate the final key as a function of the two exchanged secrets x and y and additional parameters.

Advantageously, at the end of the exchange, the responder returns a message to the initiator containing the proxies which have actually and reliably cooperated during the exchange of secrets, in order to enable it to refine its future selection of participants and to remove malicious nodes.

In a variant implementation, the messages (232) from the initiator to the proxies containing the identity of the responder and the proof of representativity are grouped together with the respective 'n' messages (244) to the proxies containing the values of the secret fragments (x1, . . . , xn).

Figure 3:
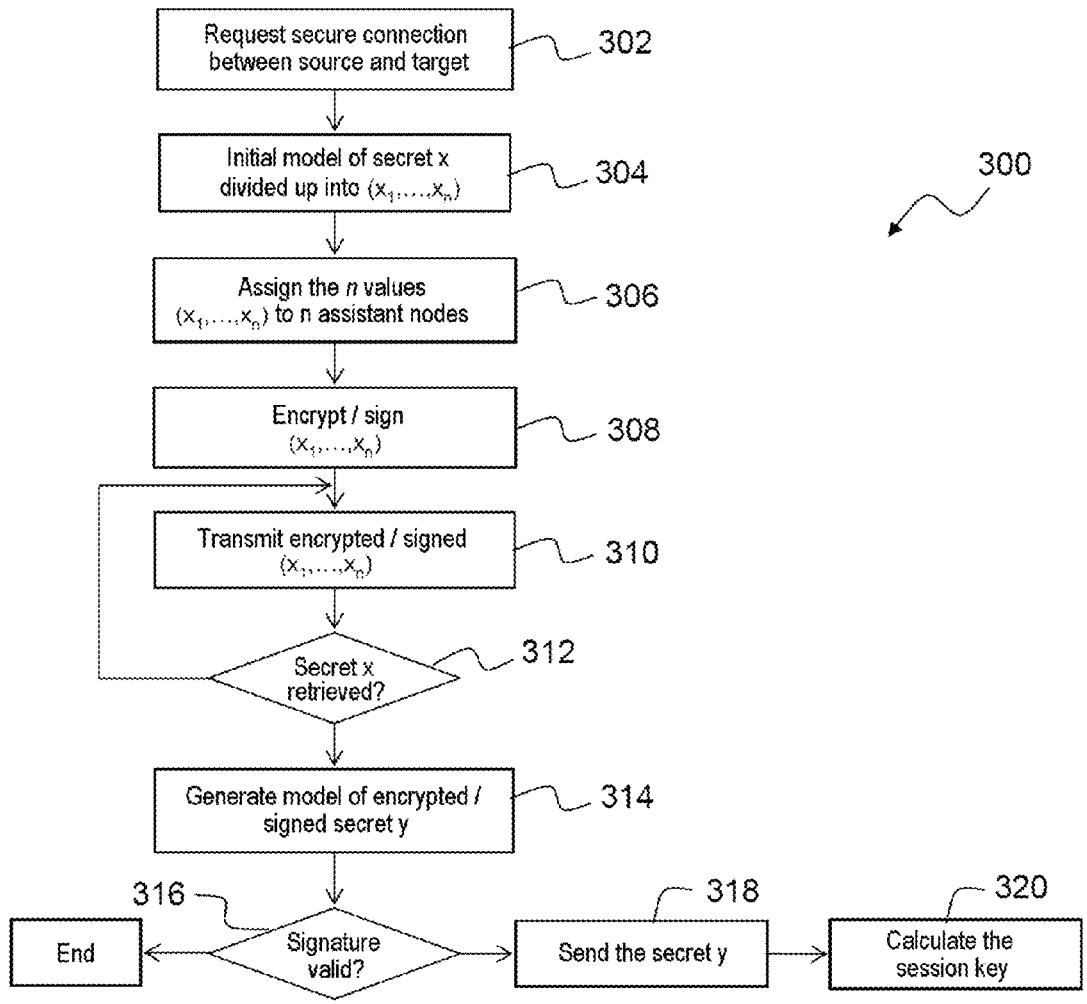
FIG. 3 shows the steps executed by the method of the invention to establish a session.

FIG. 3 sets out the steps (300) carried out by the method of the invention to establish a session in a preferred implementation.

At the step (302), a request to establish a secure connection between a source entity and a target entity is transmitted. The request can be initiated by the resource-constrained entity or by a remote server to a resource-constrained entity. The transmission of the request triggers the previously described phase (220) in order that the initiator and the responder establish the connection parameters for their session.

At the step (304), the initial model of the secret x is broken down into a plurality n of values (x1, . . . , xn).

At the step (306), the n secret values (x1, . . . , xn) are assigned to n selected proxies (P1, . . . , Pn). Each proxy receives the secret value which is assigned to it in a manner encrypted with a symmetric key.

The proxies are informed of the identity of the responder either at the step (306), or as described above in an initial step (230) where they receive the proof of their representativity for the responder.

At the next step (308), the n secret values are encrypted and signed by the proxies.

Each encrypted/signed value is transmitted to the responder at the next step (310).

The step (312) consists in reconstructing the secret x from the secret values received from the proxies. The method waits until a sufficient number of values is received in order to retrieve the initial secret value x and proceed to the next step.

At the step (314), a secret y is randomly generated by the responder and is encrypted and signed in order to transmit it to the proxies with the secret x.

At the step (316), if the signature received by the proxies is verified and validated, the secret y is transmitted to the initiator (step 318), otherwise the method is stopped.

The step (320) consists in calculating the final session key as a function of the two exchanged secrets (x, y).

Figure 4:
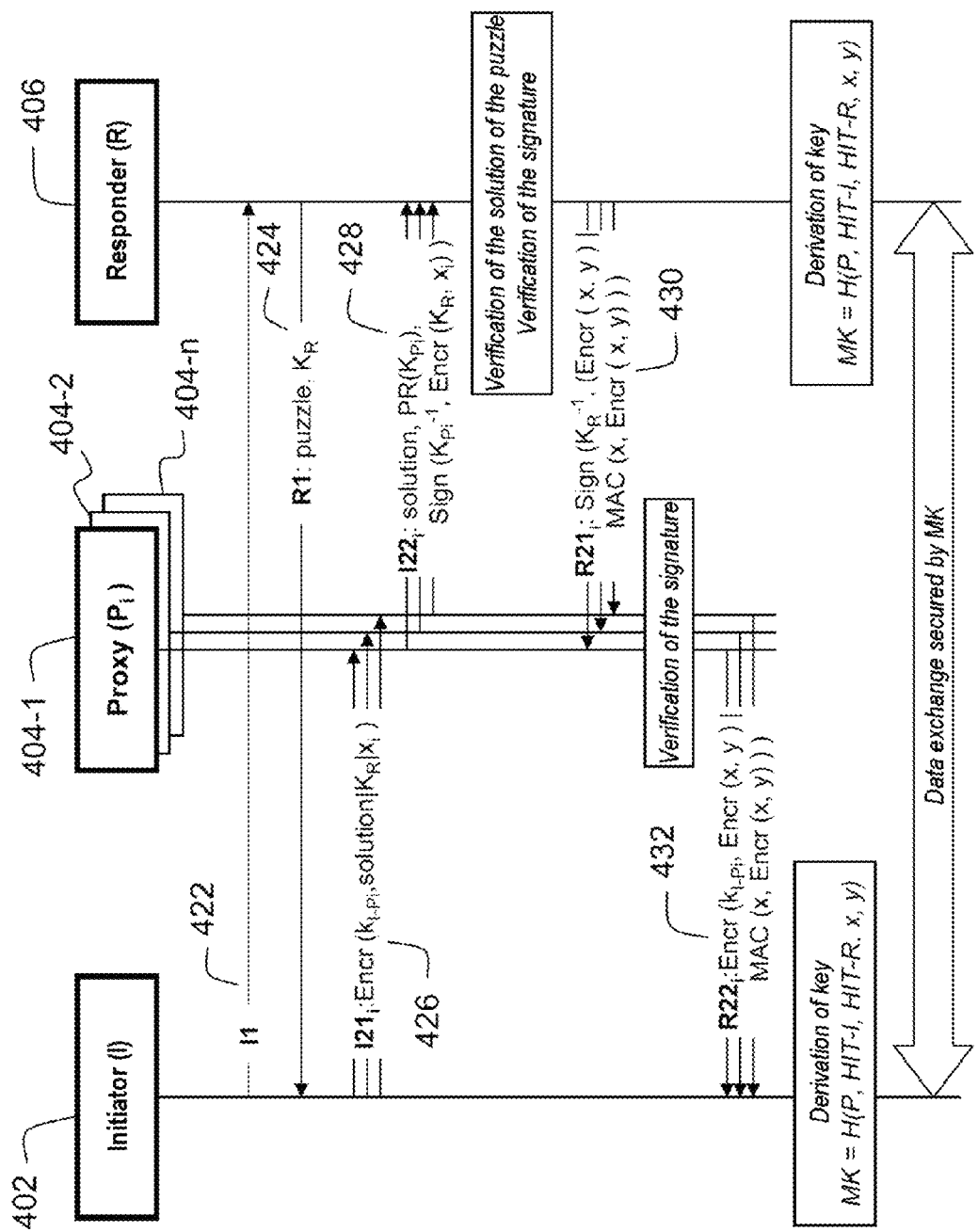
FIG. 4 shows the procedures executed between the source, target and assistant entities of the network of FIG. 1 in a variant implementation of the invention.

FIG. 4 shows the procedures executed between the source, target and assistant entities of the network of FIG. 1 in a variant implementation of the invention applied to the HIP BEX protocol. The known puzzle mechanism specified in the HIP BEX protocol is maintained in order to protect the responder against resource starvation attacks when the protocol is being executed.

In a first phase similar to the phase 220 described with reference to FIG. 2, the initiator (402) sends a first message 422 to the responder (406) to obtain the HIP association and to inform it of the supported cooperation technique for the key exchange. The responder responds with a message 424 to begin the protocol exchange. The message 424 from the responder contains the identifier of the responder, i.e. its public key $K_R$, and a puzzle composed of a cryptographic challenge that the initiator must solve before continuing the exchange protocol. The level of difficulty of the puzzle can be adjusted according to the trust level of the initiator and its present resource capacities. The puzzle exchange in the HIP protocol is a means of defense to protect the responder against denial-of-service attacks. The latter remains passive until a valid response is received from the initiator. The initiator calculates the solution of the received puzzle.

Then, the initiator transmits (426) the solution to the n proxies (404-1, 404-n) in messages $I21_1 \ldots I21_n$. These messages are also used to transmit the n fragments of the secret x to the n proxies. Each connection between the initiator and a proxy is a connection secured by a symmetric key $k_{I\text{-}Pi}$.

Each proxy, upon receiving its respective message, encrypts it by means of the public key $K_R$ from the receiver and transmits it (428) to the responder in a message $I22_i$.

Upon receiving a message $I22_i$, the responder verifies the validity of the puzzle solution. In the absence of a correct solution, the corresponding message is rejected. If there is a correct solution present, the responder continues with the protocol exchange. It sends (430) a message $R21_i$ to each proxy containing its secret y encrypted with the secret key x, attaching thereto a "Message Authentication Code" (MAC) authentication value calculated on the message with the key x. This authentication value enables the initiator to make sure that the value received definitely comes from the responder, and also that the responder has definitely received the key x transmitted initially.

Upon receiving the message (430) from the responder, the proxy verifies its integrity and securely transmits (432) the content to the initiator in a message $R22_i$. As soon as an appropriate number, typically greater than n/2, of the same content is received from the various proxies, the initiator makes sure that the message transmitted by the responder is valid. After that, it verifies the MAC in order to make sure that the responder has obtained the same secret x and to verify the integrity of the message. Once this integrity is validated, the initiator decrypts the secret y in order to finalize the installation of the main session key.

Advantageously, the final key, referred to as "Master Key" (MK) established between the initiator and the responder is calculated as follows:

$$MK := H((P|HIT\text{-}I|HIT\text{-}R|x|y)$$

where:

H ( ) is a unidirectional cryptographic hash function;

P is a parameter of the puzzle, included to ensure the freshness of the session key;

HIT-I is the Host Identity Tag of the initiator, i.e. a truncated hash of its cryptographically generated identifier;

HIT-R is the Host Identity Tag of the responder; and x and y are the secret values of the initiator and the responder respectively.

The person skilled in the art will appreciate that variations can be brought about on the method as described in a preferred manner, while maintaining the principles of the invention. Thus, it is possible that the establishment of the connection between a resource-constrained entity and an unconstrained server be initiated by the latter. The first message sent (222, 422) is by the server, and then the method follows the steps described above.

In one variant where the constrained entities are in the context of the Internet of Things, the identities of nodes having to act as proxies can be provided securely by a trust resolution infrastructure. They also make possible the simple placing into communication of nodes based on different technologies, such as active tags, IP nodes, non-IP nodes, as soon as the cryptographic identifiers are used at a layer higher than the IP layer.

The present invention can be implemented from hardware and/or software components. It can be available as a computer program product on a medium that can be read by a computer. The medium can be electronic, magnetic, optical or electromagnetic, or it can be an infrared type broadcast medium. Such media are for example semiconductor memories (Random Access Memory (RAM), Read-Only Memory (ROM)), tapes, floppy disks or magnetic or optical disks (Compact Disc-Read-Only Memory (CD-ROM), Compact Disc-Read/Write (CD-R/W) and DVD).

Thus, the present description illustrates a preferred implementation of the invention, but is not limiting. An example has been chosen to provide a good understanding of the principles of the invention, and an actual application, but it is not at all exhaustive and must enable the person skilled in the art to bring about modifications and variant implementations while observing the same principles.

The invention claimed is:

1. In a communication network comprising a plurality of communicating entities, a method to establish a secure end-to-end communication between a source entity and a target entity having different resource constraints a session key between a source entity and a target entity, the method comprising the steps of:

generating at the source entity a secret x for the source entity, the secret comprising n secret values (x1, xi, xn);

assigning by the source entity each of the n secret values (xi) to a respective assistant entity (Pi) among the plurality of communicating entities, wherein each assistant entity is selected by the source entity to be a proxy entity with fewer resource constraints than the source entity;

encrypting and signing by each assistant entity each assigned secret value (xi);

authenticating the source entity upon reception by the target entity of one or more encrypted and signed secret values (x1, xi, xn) of the n assistant entities;

generating an encrypted and signed secret y with the target entity, wherein the secret y is encrypted with the secret x;

authenticating the target entity upon reception, by at least one of the n assistant entities (P1, Pi, Pn), of the encrypted and signed secret y; and generating a session key between the source entity and the target entity upon reception by the source entity of the authenticated secret y and of said secret x of the source entity.

2. The method as claimed in claim 1, comprising, after encrypting and signing the assigned secret value (xi) for each assistant entity, transmitting the encrypted and signed secret values to the target entity.

3. The method as claimed in claim 1, further comprising, after generating the encrypted and signed secret y with the target entity, transmitting the encrypted and signed secret values x and y to the plurality of assistant entities.

4. The method as claimed in claim 1, comprising, after authenticating the target entity, transmitting the secret value y to the source entity.

5. The method as claimed in claim 1, comprising, before generating the secret x for the source entity, detecting a request to set up a secure connection between the source entity and the target entity.

6. The method as claimed in claim 5, comprising, after detecting a request to set up a secure connection between the source entity and the target entity, defining a cryptographic data exchange protocol between the source entity and the target entity.

7. The method as claimed in claim 6, wherein defining a cryptographic data exchange protocol comprises exchanging messages between the source and target entities, the messages comprising at least information relating to security supported by each source and target entity, to identities of the source and target entities, to cryptographic algorithms supported by the source and target entities, and to key establishment methods.

8. The method as claimed in claim 7, in which a key establishment system is applied to an HIP BEX (Host Identity Protocol Base Exchange) protocol.

9. The method as claimed in claim 1, comprising, before assigning each secret value (xi) to the assistant entity (Pi), selecting n assistant entities (P1, Pi, Pn), each assistant entity (Pi) being less resource-constrained than the source entity.

10. The method as claimed in claim 1, comprising, assigning each secret value (xi) to the assistant entity (Pi), transmitting to the assistant entities, elements for proving their representativity of the source entities.

11. The method as claimed in claim 10, comprising, before authenticating the source entity, transmitting said proof elements to the target entity.

12. A system for establishing a session key between a source entity and a target entity in a communication network comprising a plurality of communicating entities, the system comprising means for implementing the steps of the method as claimed claim 1.

13. The system as claimed in claim 12, in which the source entity is resource-constrained and the target entity is a remote server that is not resource-constrained.

14. A non-transitory computer-readable medium comprising code instructions for performing the steps of the method as claimed in claim 1.

15. The method of claim 1, wherein the method is performed without human interaction.

* * * * *